United States Patent [19]
Sears, Jr.

[11] Patent Number: 5,485,686
[45] Date of Patent: Jan. 23, 1996

[54] HI-PERFORMANCE DESICCANT TOWER

[75] Inventor: Charles F. Sears, Jr., Tolland, Conn.

[73] Assignee: Dri-Air Industries, Inc., East Windsor, Conn.

[21] Appl. No.: 248,739

[22] Filed: May 25, 1994

[51] Int. Cl.$^6$ .................................................. F26B 21/06
[52] U.S. Cl. ............................................. 34/473; 34/80
[58] Field of Search ................................ 34/416, 472, 473, 34/487, 553, 80

[56] References Cited

U.S. PATENT DOCUMENTS

| | | | |
|---|---|---|---|
| 2,434,419 | 1/1948 | Laughlin et al. | 34/35 |
| 2,458,435 | 1/1949 | Simpson | 34/473 |
| 2,459,463 | 1/1949 | Simpson | 34/13 |
| 2,535,902 | 12/1950 | Dailey, Jr. | 183/4.5 |
| 2,783,547 | 4/1954 | Bieger et al. | 34/53 |
| 3,436,839 | 12/1966 | Ellington | 34/80 |
| 3,466,756 | 11/1967 | Tooby | 34/5 |
| 3,609,871 | 2/1970 | Ellison | 34/13 |
| 3,621,585 | 11/1971 | Robertson | 34/10 |
| 3,972,129 | 8/1976 | Graff | 34/32 |
| 4,022,560 | 5/1977 | Heinonen | 425/317 |
| 4,094,075 | 6/1978 | Caruso | 34/72 |
| 4,189,848 | 2/1980 | Ko et al. | 34/32 |
| 4,251,923 | 2/1981 | Kuri | 34/15 |
| 4,413,426 | 11/1983 | Gräff | 34/27 |
| 4,438,325 | 3/1984 | Gellert | 219/536 |
| 4,509,272 | 4/1985 | Gräff | 34/27 |
| 4,570,360 | 2/1986 | Nakagomi | 34/80 |
| 4,601,114 | 7/1986 | Noguchi | 34/473 |
| 4,653,199 | 3/1987 | McLeod et al. | 34/80 |
| 4,656,757 | 4/1987 | Oschmann | 34/27 |
| 4,665,629 | 5/1987 | Cramer | 34/54 |
| 4,687,573 | 8/1987 | Miller et al. | 210/143 |
| 4,858,335 | 8/1989 | Roth | 34/473 X |
| 4,870,760 | 10/1989 | Gräff | 34/32 |
| 4,974,337 | 12/1990 | Tavakoli et al. | 34/27 |
| 5,187,131 | 2/1993 | Tiggelbeck et al. | 502/34 |
| 5,335,426 | 8/1994 | Settlemyer et al. | 34/80 |

FOREIGN PATENT DOCUMENTS 706045  3/1954  United Kingdom ............... 34/473

Primary Examiner—Henry A. Bennet
Assistant Examiner—William C. Doerrler
Attorney, Agent, or Firm—McCormick, Paulding & Huber

[57] ABSTRACT

The invention resides in a process air dryer system for plastics processing machines and method for drying process air comprising two desiccant towers repeatedly alternating between process and regeneration cycles. In addition to conventional bottom heaters, each tower has an additional generally central heater so as to reduce the time required to regenerate saturated desiccant. When a tower is undergoing regeneration of its desiccant, generally centrally heaters aid conventional bottom heaters in drying saturated desiccant so as to reduce conventional regeneration cycle time by as much as 25% to 30%.

19 Claims, 3 Drawing Sheets

HI-PERFORMANCE DESICCANT TOWER

BACKGROUND OF THE INVENTION

The present invention relates to a system of drying and heating process air to be circulated for drying hygroscopic thermoplastic material contained in a drying hopper before the material is introduced into a plastic processing machine. The invention is concerned more particularly with improved desiccant towers used in a drying system for effectively drying thermoplastics in areas of high ambient humidity and for considerably reducing the time required to effectively and completely regenerate or purge moisture from a saturated desiccant tower.

The drying of thermoplastics before entering plastic processing machines such as injection, and extrusion molding machines is highly critical. Thermoplastic materials are generally hygroscopic. Moisture in ambient air can harm the mechanical, electrical, and visual properties of the finished plastic product. Hence, there has long been the need for reliable and efficient dryer systems to dry thermoplastic material contained in a plastics storage device such as a drying hopper before the material is processed. Drying thermoplastic material is usually accomplished by first drying process air which subsequently circulates through and drives moisture from thermoplastics contained in a drying hopper.

A standard implementation of a dryer system used with plastic processing machines comprises a desiccant tower containing desiccant (adsorbent) for adsorbing moisture from ambient or process air while the tower is in a process cycle. Adsorbents used are molecular solids oppositely ionized relative to that of water molecules. The water molecules are thereby electrically attracted and absorbed into the molecular solid. Some well-known types of solid desiccants used in dryer systems include molecular sieves, silica gel, and activated alumina.

The reason for using such adsorbents is due to their high moisture-holding capacity defined by the equation: equilibrium $H_2O$ capacity=lb. of adsorbed $H_2O$/100 lb. of adsorbent. At a typical thermoplastics drying temperature of 150° to 300° Fahrenheit (F.), some molecular sieves can adsorb as much as 20% of their dry weight in moisture, such as water.

The desiccant, however, eventually becomes saturated, thereby losing its effectiveness for drying process air. Consequently, the saturated desiccant must be taken "off-stream" in order to regenerate its moisture adsorbing capacity. A heater located at or near the base of the saturated tower super-heats air circulating upwardly through the tower. The super-heated air transfers its thermal energy to the saturated desiccant by means of thermal convection. Moisture evaporates and is driven off the hot desiccant, whereupon the hot circulating air carries the evaporated moisture away from the saturated tower to be vented.

Obviously, the time (usually hours) necessary to regenerate the saturated desiccant cannot be used for drying thermoplastic material. In response to the off-stream problem, several solutions have been developed to ensure a constant supply of dry process air to the drying hopper even when a saturated tower is under regeneration (in a regeneration cycle).

As one solution, Conair dryer models CD-100 through CD-2400 employ four desiccant towers. When a saturated desiccant tower needs to be regenerated, a carrousel indexes a fresh desiccant tower to replace the saturated tower. Hence, desiccant tower indexing assures an uninterrupted supply of dry process air for drying thermoplastics. However, the drying system is expensive and prone to mechanical breakdown because it uses a multitude of moving parts. Other solutions have been developed using fewer moving parts.

Dual fixed-bed desiccant towers have become an industry standard as a simple solution for maintaining a constant flow of dry process air. After an adsorbent in a desiccant tower is fully regenerated, valves redirect the process air flow so that the newly regenerated tower is subsequently placed in a process cycle, while simultaneously the other tower previously in a process cycle is subsequently placed in a regeneration cycle. The towers are, therefore, always in opposite cycles (i.e. process vs. regeneration). Hence, desiccant tower switchover also assures an uninterrupted supply of dry process air with the advantage of few moving parts.

The above-mentioned equipment, however, may fail under high humidity conditions. As the humidity of the ambient air increases, the effective time period of the process cycle decreases because of a faster build-up of moisture within the surface of the desiccant. Danger arises when the tower in a process cycle becomes fully saturated before the other tower is completely regenerated.

By enlarging the size of the tower to hold more desiccant, the effective process cycle time period can be increased. This solution however is generally undesirable because the time needed to completely regenerate a fully saturated tower also increases.

Another solution is to decrease the regeneration cycle time period by more rapidly heating the saturated desiccant. U.S. Pat. No. 2,783,547 discloses dual fixed-bed desiccant towers each containing a heater coil helically wound within a central metal tube extending longitudinally along a central axis of the tower. Metal fins extend outwardly into surrounding silica gel to facilitate rapid heating of the desiccant as regeneration air is forced through the gel. Because desiccant does not have good thermal conductivity, the outwardly directed heating of the surrounding gel may be undesirably localized near the thermally conductive fins.

Similarly, U.S. Pat. No. 4,601,114 discloses a helically wound heater coil extending along the central axis of a desiccant tower. Regeneration air, however, is forced sideways from the central heater in order to heat the surrounding desiccant. Again, heating of the surrounding desiccant may tend to be undesirably localized and irregular since convection heat flow from the sideways-forced air is counter to the natural tendency of the regeneration air to rise. Hence, a more effective and even heating of the desiccant can be achieved by circulating regeneration air upwardly from below the desiccant.

In response to the above-mentioned difficulties, it is a general object of the present invention to reduce the regeneration cycle time period 25% to 30% from that of a standard desiccant tower having a single heater.

It is another object of the present invention to substantially increase the effective process cycle time period by doubling the height of a standard desiccant tower so as to ensure an uninterrupted supply of dry process air under high humidity conditions.

SUMMARY OF THE INVENTION

One aspect of the invention resides in a system of drying and heating process air to be circulated for drying hygroscopic thermoplastic material contained in a drying hopper before the material is introduced into a plastic processing machine. A drying hopper is provided for containing hygroscopic thermoplastic material dried by process air before the thermoplastic material is introduced into a plastics processing machine. First and second desiccant towers are also provided wherein each of the towers alternates between a process cycle and a regeneration cycle while the other tower is in an opposite cycle. Desiccant is contained in the first and second desiccant towers for adsorbing moisture from the process air. Some of the process air is further used as regeneration air for driving moisture off saturated desiccant in one of the towers in a regeneration cycle. Air conduit means provides a path for circulating the process air between the drying hopper and the first and second desiccant towers. Air circulating means provides for circulating the process air through the air conduit means. Air flow directing means provides for directing the process air to the top end of one of the desiccant towers thereby placing the tower in a process cycle while the other of the towers is placed in a regeneration cycle. The air flow directing means also directs the regeneration air exiting from a top end of the other of the towers in a regeneration cycle to a vent. Means are provided for regulating the time period and temperature of the process and regeneration cycles. First and second bottom heater means are respectively located adjacent to a bottom end of the first and second desiccant heating towers to heat the desiccant so as to adsorb moisture from the process air circulating downwardly thorough one of the towers in a process cycle, and for simultaneously super-healing and driving moisture off the adsorbent by means of the regeneration air circulating upwardly through the other of the towers in a regeneration cycle. The regeneration air carries by means of convection a generally bottom-originating hot convection wave front propagating upwardly through the desiccant in the tower in a regeneration cycle. The first and second generally central heater means are respectively located between top and bottom ends of the first and second desiccant towers for super-heating and driving moisture off the desiccant by means of the regeneration air carrying a generally centrally-originating hot convection wave front propagating upwardly through the desiccant of one of the towers in a regeneration cycle. The generally centrally-originating hot convection wave front coupled with the bottom-originating hot convection wave front considerably reduces the time to completely regenerate the saturated desiccant in the one of the towers in a regeneration cycle.

Another aspect of the present invention resides in a method of drying and heating process air to be circulated for drying hygroscopic thermoplastic material contained in a drying hopper before the material is introduced into a plastic processing machine. The method comprises the steps of upwardly circulating hot, dry process air so as to dry thermoplastic material contained in a drying hopper. Two desiccant towers are each provided containing desiccant for adsorbing moisture from the process air. Moist process air leaves the drying hopper and is directed to one of the towers thereby placing one of the towers in a process cycle while the other of the towers is simultaneously placed in a regeneration cycle. The moist process air is downwardly circulated through the one of the desiccant towers in a process cycle to adsorb moisture from the moist process air and to heat the moist process air to a predetermined process temperature. The dried process air is returned back to the drying hopper to further dry the thermoplastic material contained therein. Simultaneously, hot regeneration air is circulated upwardly through the other of the desiccant towers in a regeneration cycle whereby moisture is driven off saturated desiccant by means of upwardly propagating hot convection wave fronts originating from the bottom and from a generally central portion of the other of the desiccant towers. The moist process air leaving the drying hopper is redirected to the other of the desiccant towers after completion of the regeneration cycle thereby placing the one of the desiccant towers in a regeneration cycle and the other of the desiccant towers in a process cycle. The process and regeneration cycles continue to alternate between the one and the other of the desiccant towers so as to form a repeating sequence.

DESCRIPTION OF THE PREFERRED EMBODIMENTS

Figure 1A:
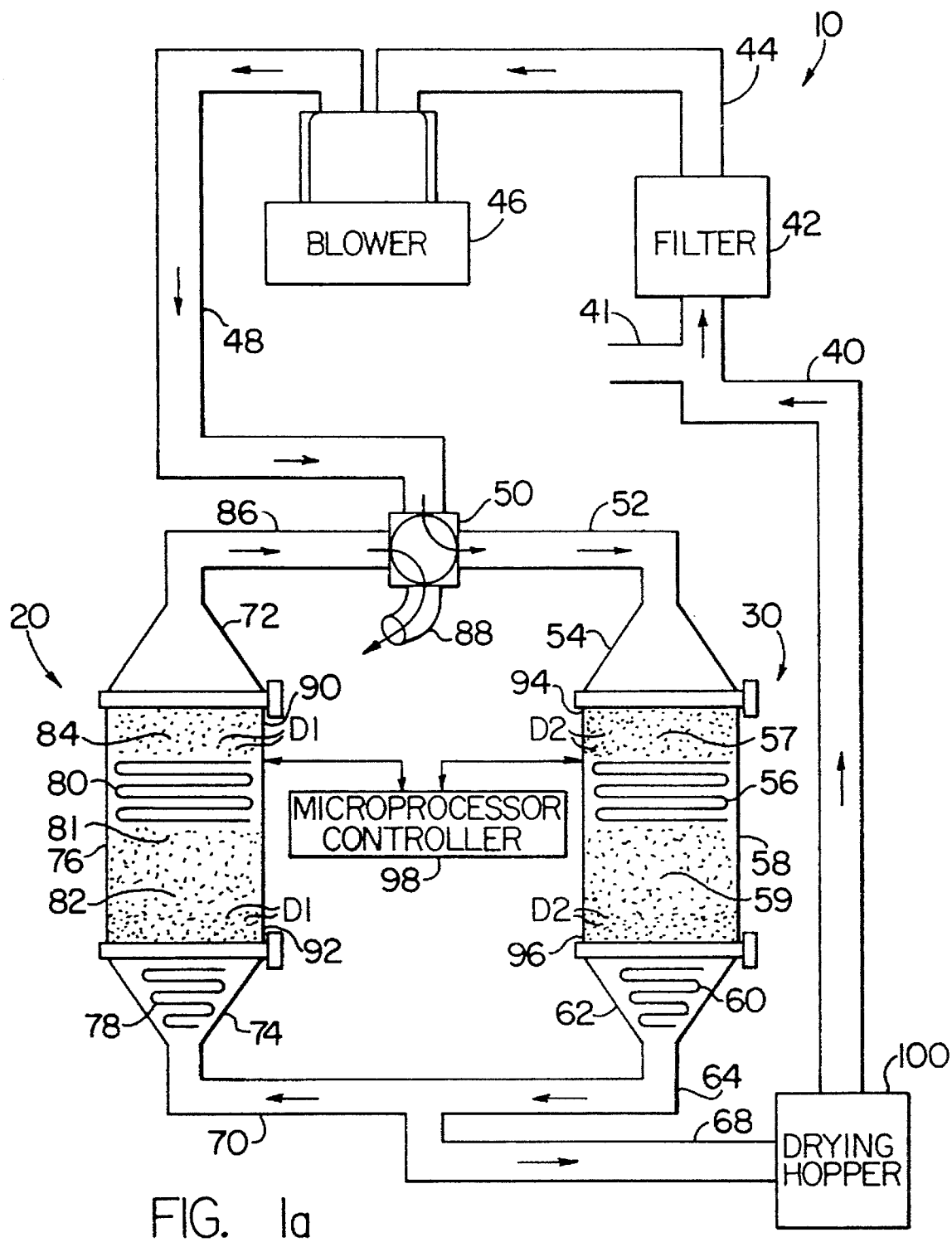
FIG. 1a schematically illustrates a thermoplastics drying system using improved fixed-bed desiccant towers in accordance with the present invention.
Figure 1B:
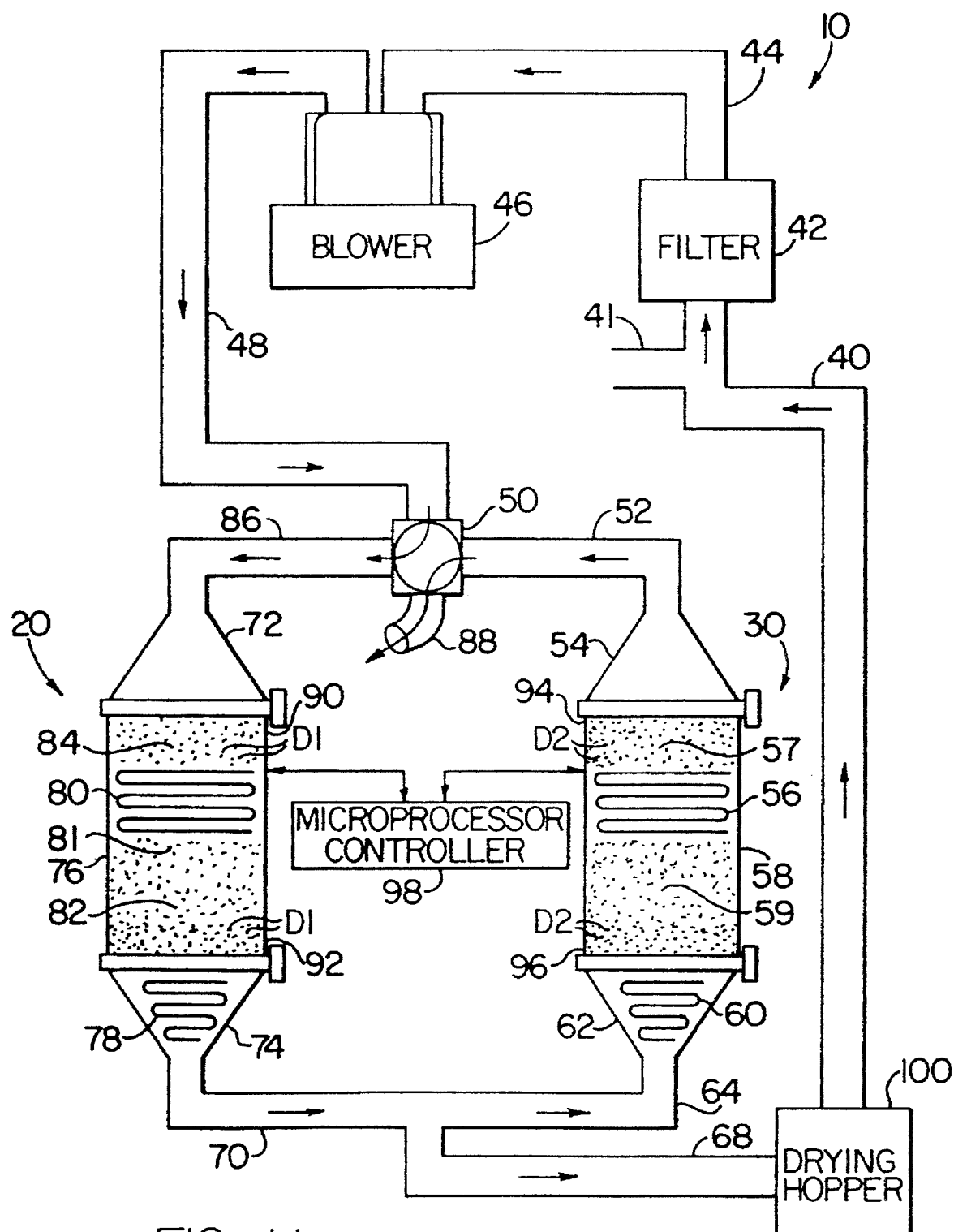
FIG. 1b schematically illustrates a different process air flow path from that of FIG. 1a after a desiccant bed changeover.

FIGS. 1a and 1b (using the same reference numerals to designate like parts) schematically illustrate fixed desiccant towers 20 and 30 employing generally central heater coils, 80 and 56 respectively arranged in a novel way. The desiccant towers are employed in a thermoplastics drying system 10 which dries and heats process air to be circulated for drying hygroscopic thermoplastic material contained in a drying hopper 100, before the material is introduced into a plastic processing machine (not shown).

Desiccants (adsorbents) D1 and D2 forming packed desiccant beds in the desiccant towers 20 and 30 respectively, are used to dry the process air because of their high moisture adsorbing capacity defined by the equation: equilibrium $H_2O$ capacity=lb. of adsorbed $H_2O$/100 lb. of adsorbent.

As mentioned, the adsorbents are molecular solids oppositely ionized relative to that of water molecules. The water molecules are thereby electrically attracted and bond to the surface of the adsorbent. In this instance, Molecular Sieve Type 4A manufactured by Union Carbide is chosen as an adsorbent because it can adsorb as much as 20% of its dry weight in moisture at a typical thermoplastics drying temperature of 150° F. to 300° F.

Referring now to FIGS. 1a and 1b in more detail, upwardly circulating process air which has absorbed moisture from hygroscopic thermoplastic material contained in the drying hopper 100, is directed (as shown by arrows) via air conduits, such as hollow cylindrical tubes in this instance, from an upper outlet of the drying hopper through conduit 40 and through filter 42 which removes fines from the moist process air. Air intake opening 41, formed in the conduit 40 allows a relatively small amount of outside air to mix with the moist process air in the conduit 40 in order to compensate for air exiting at vent 88. The filtered, process air is then directed through conduit 44 toward and through blower 46 which circulates the process air in a virtual closed-loop path, to and from the desiccant towers 20,30 and the drying hopper 100. Process air leaving the blower 46 circulates through conduit 48 toward and through a four-way valve 50 directing the moist process air to one of the desiccant towers 20 and 30 to be explained more fully below.

During a first predetermined time interval shown in FIG. 1a, the four-way valve 50 directs the moist process air through conduit 52 and toward the desiccant tower 30 which is in a process cycle to adsorb moisture from the process air. The desiccant tower 30 comprises tower body 58, and top and bottom cones 54 and 62 respectively. The cones 54 and 62 communicate with the tower body 58 which is packed with the desiccant D2. The tower body 58 houses the central heater coil 56 in a novel arrangement, preferably extended in a plane transverse to the longitudinal direction of the tower body 58 and located generally centrally of the tower's top and bottom ends 94 and 96 respectively. (In FIGS. 1a and 1b the central heater coil 56 is shown slightly closer to the top end 94 than that of the bottom end 96 for reasons to be explained hereinbelow.) The bottom cone 62 houses bottom heater coil 60, also preferably extended in a plane transverse to the longitudinal direction of the tower body 58.

In FIG. 1a, the bottom heater coil 60 heats the process air to an optimal thermoplastics drying temperature of about 150° F. to 300° F. The process air circulates downwardly through the desiccant tower 30 from a top portion 57 defined between the top end 94 and the central heater coil 56 and continues through a bottom portion 59 defined between the central heater coil 56 and the bottom end 96. Meanwhile, moisture carried in the process air is adsorbed by the surrounding desiccant D2 in the tower body 58. The dried, heated process air then exits the desiccant tower 30 through the bottom cone 62 and enters into conduit 64.

As determined by air flow pressure through a standard desiccant-packed tower and drying hopper, the greater portion (95% to 98%) of the dried, process air typically returns to the drying hopper 100 through conduit 68 to further dry the thermoplastic material.

A smaller portion (2% to 5%) of the dried, process air is used as regeneration air and circulates through conduit 70 and into the desiccant tower 20 (in a regeneration cycle) to regenerate or drive moisture off its desiccant. The desiccant tower 20 comprises tower body 76, and top and bottom cones 72 and 74 respectively. The cones 72 and 74 communicate with the tower body 76 which is packed with the desiccant D1. The tower body 76 houses the central heater coil 80, preferably extended in a plane transverse to the longitudinal direction of the tower body 76 and located generally centrally of top and bottom ends, 90 and 92 respectively, of the tower body 76. (As is the case with the central heater coil 56 of the tower 30, in FIGS. 1a and 1b the central heater coil 80 of the tower 20 is shown slightly closer to the top end 90 than that of the bottom end 92 for reasons to be explained hereinbelow.) The bottom cone 74 houses bottom heater coil 78, also preferably extended in a plane transverse to the longitudinal direction of the tower body 76.

The generally central heater coil 80 and the bottom heater coil 78 simultaneously super-heat the regeneration air circulating upwardly through the tower 20 to a predetermined regeneration temperature of about 550° F. to 600° F. to completely drive moisture off (regenerate) the saturated desiccant D1 in the tower body 76.

As the desiccant tower 20 is undergoing regeneration, the bottom heater coil 78 produces a first, bottom-originating hot convection wave front propagating upwardly with the process air through D1. The wave front originates near the bottommost layers of D1 at 92 and flows upwardly through D1 in a bottom portion 82 of the tower body 76 defined between the bottom end 92 and the central heater coil 80.

The first convection wave front continues to propagate through a top portion 84 of the tower body 76 defined between the top end 90 and the central heater coil 80 of the desiccant tower 20. Similarly, the central heater coil 80 produces a novel second, generally centrally-originating hot convection wave-front propagating upwardly through D1 in the top portion 84.

By means of the thermal convection, regeneration air circulating upwardly through the tower body 76 super-heats D1 to a regeneration temperature of about 550° F. to 600° F. so as to drive moisture off the desiccant. The moisture-laden regeneration air is then swept out of the tower 20 through the top cone 72. The saturated regeneration air circulates through conduit 86 and toward the valve 50 which directs the air out the vent 88.

One advantage of adding the novel second generally central heater coil is that the two hot convection wave fronts permit the standard height of a desiccant tower as well as the amount of desiccant filling the tower to be doubled. Doubling the amount of desiccant substantially increases the effective length of the process cycle resulting in the ability to maintain an uninterrupted supply of dry, process air even under high humidity conditions. In addition, the two hot convection wave fronts also reduce the time to completely regenerate the saturated desiccant by about 25% to 30% over that of conventional methods.

One acceptable trade-off of doubling the tower body height is that after regeneration, the time required to cool the desiccant down to process temperature before switching the tower to a process cycle is approximately 25% more than that of using a conventional tower height with a single heater.

During a second predetermined time period after the tower 20 is completely regenerated, as illustrated in FIG. 1b, the four way valve 50 effects a desiccant bed changeover by diverting the flow of the moist process air (as shown by arrows) through the conduit 86 and to the desiccant tower 20, so as to remove the tower 20 from its regeneration cycle and place it in an opposite (i.e., process) cycle. The desiccant tower 30 is likewise removed from its process cycle and placed in an opposite, (i.e., regeneration) cycle. Hence, repeatedly alternating the cycles of the towers 20 and 30 between process and regeneration always ensures a fresh tower in a process cycle for delivering a constant, uninterrupted supply of dry process air for the drying of thermoplastics.

Due to the symmetry of the operation of drying the process air after the desiccant bed changeover by merely interchanging the towers 20 and 30 with respect to the process air flow path, no further explanation for drying the process air as shown in FIG. 1b is deemed necessary.

Figure 2:
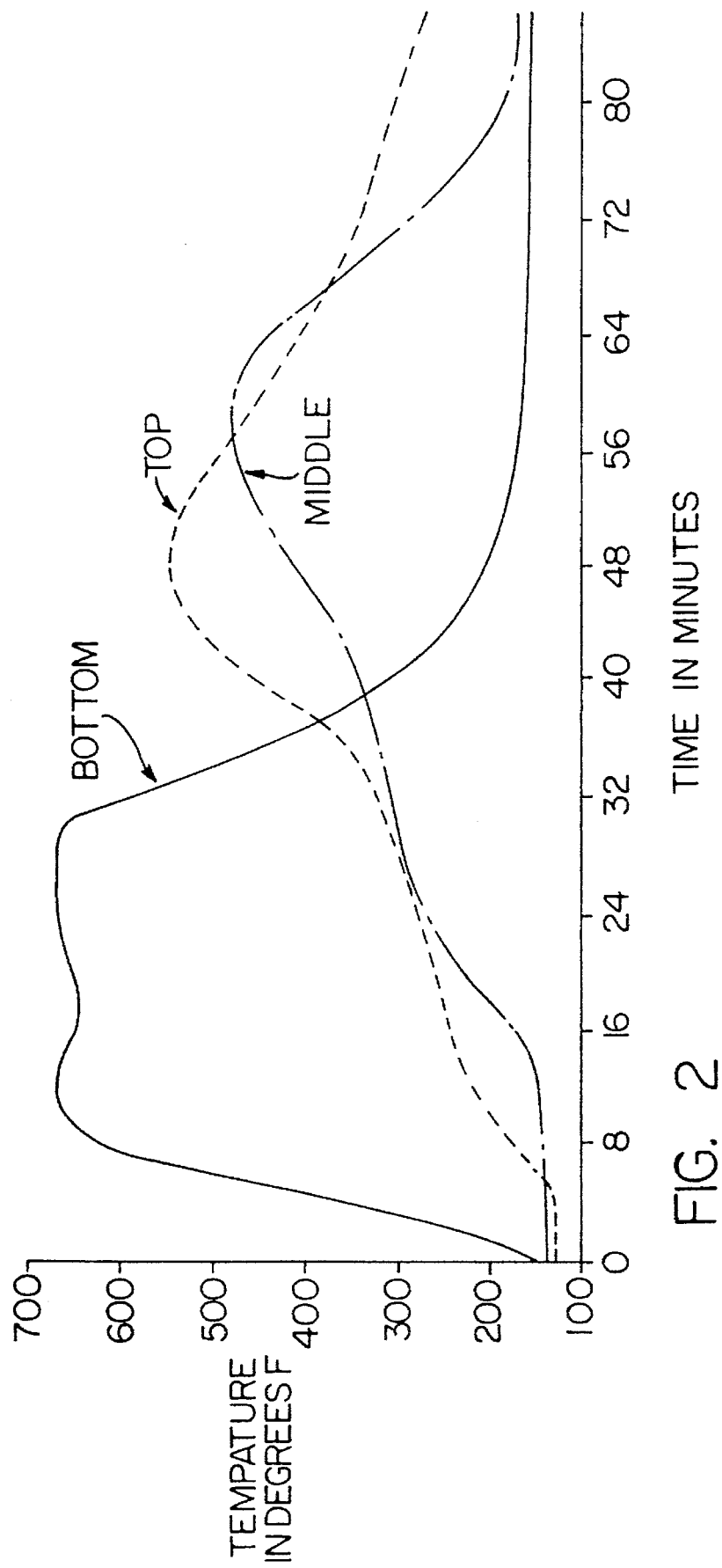
FIG. 2 is a graph including three curves labeled TOP, MIDDLE, and BOTTOM illustrating the average temperature over time of desiccant in a lower portion (BOTTOM), an upper portion (TOP), and a central portion (MIDDLE) of an improved desiccant tower undergoing a regeneration cycle.

FIG. 2 graphically illustrates a preferred regeneration temperature profile of, in this instance, the tower 20 shown in FIG. 1a over time of its topmost layers of D1 at 90 shown by the curve labeled (TOP), the bottommost layers of D1 at 92 shown by the curve labeled (BOTTOM), and the middle layers of D1 at 91 immediately below the central heater coil at 80 shown by the curve labeled (MIDDLE).

Referring to FIGS. 1a and 2, immediately prior to time zero, the desiccant tower 20 is ending its process cycle and nearing the beginning of its regeneration cycle. As seen by all three of the curves, i.e., TOP, BOTTOM, and MIDDLE, to the extreme left of FIG. 2, the bottom heater coil 78 has been maintaining D1 at a process temperature of about 150° to 300° F.

The regeneration cycle of the desiccant tower 20 begins at time zero. A microprocessor controller 98 shown in FIGS.

1a and 1b may be employed to automatically regulate the time period and temperature of the process and regeneration cycles. The slopes of all three curves start to increase as the central and bottom heater coils, 80 and 78, heat the desiccant from 150° F. to 300 ° F. to a regeneration temperature of about 550° F. to 600° F. The temperature of D1 respectively located at the top and bottom portions 84 and 82 of the tower 20 do not rise at the same rate due to the differing distribution of moisture throughout the tower 20. When the process air circulated downwardly through D1 during the previous process cycle, a greater portion of the moisture was adsorbed in the top portion 84 of tower 20. Because more energy is required to heat the adsorbed moisture in the top portion 84, less energy is transferred for directly heating the adjacent desiccant. Hence the TOP curve representing the temperature of D1 in the topmost layers of desiccant at 90 rises more slowly than does that of the BOTTOM curve representing the temperature of D1 in the bottom portion 82 at 92.

However, the layer of desiccant at 81 just below the central heater coil 80 rises more slowly than does the moist, topmost layers of desiccant at 90. The reason is that the desiccant at 81 below the central heater is only heated by the wave front originating from the bottom heater coil 78, whereas the topmost layers of desiccant at 90 are heated by the wave front originating from the bottom heater coil 78 as well as the wave front originating from the central heater coil 80.

In general, the temperature rise levels off between 210° F. to 250° F. during which energy is expended solely to boil off moisture from D1 (latent heat of vaporization). The leveling off of temperature at the topmost layers of D1 at 90 (TOP) and middle layers at 91(MIDDLE) are relatively longer than that of the bottommost layers of D1 at 92 (BOTTOM) because of the greater moisture content in the top portion 84. After most of the moisture is boiled off, the temperature of the desiccant throughout the desiccant tower 20 resumes rising at relatively higher rates.

Because of the higher moisture content of the top portion 84, it has been determined through experiment that placing the central heater coil 80 closer to the topmost layers of D1 at 90 than that of the bottommost layers of D1 at 92 results in a more effective and efficient means for regenerating the desiccant. For example, the central heater coil 80 may be placed so that the top portion 84 is about 60% to 70% of the length of the bottom portion 82.

It has also been determined through experiment that the best, fastest, and most energy efficient results for regenerating the desiccant D1 are attained by heating the bottom portion 92 of the tower 20 shown in the BOTTOM curve to about 550° F. to 600° F. and maintaining the temperature until the topmost layers 90 shown in the TOP curve reaches 350° F. after about forty minutes into the cycle. Thereafter, power to both the bottom heater coil 78 and the central heater coil 80 is stopped by the microprocessor controller 98 for cooling the desiccant which is immediately evident in FIG. 2 by the descent of the BOTTOM curve from a temperature range 550° F. to 600° F. when the FOP curve temperature is about 350° F.

Meanwhile, the hot, bottom-originating convection wave front continues to propagate upwardly into the top portion 84 of the desiccant tower 20. Consequently, the desiccant temperature shown in the TOP curve continues to rise to the desired regeneration temperature of about 550° F. to 600° F. even though the temperature shown in the BOTTOM curve is simultaneously rapidly dropping.

Eventually, the TOP and BOTTOM curves merge as the desiccant in the topmost layers of D1 at 90 also drops down to and levels off at the process temperature of about 150° F. to 300° F. After about 20 minutes required to completely cool D1 to the process temperature of 150° F. to 300° F., the four-way valve 50 effects a cycle changeover of the towers 20 and 30.

It will be understood that numerous modifications and substitutions may be made without departing from the spirit of the invention. For example, different types of heaters or even multiple heaters may be used either inside or outside along the length of the desiccant tower. In addition, the generally central heaters may be placed considerably off-center of the tower for obtaining the shortest effective regeneration cycle time. Also, different types of desiccant from the type mentioned may be substituted. Accordingly, the present invention has been described in several preferred embodiments by way of illustration, rather than limitation.

I claim:

1. A system of drying and heating process air to be circulated for drying hygroscopic thermoplastic material contained in a drying hopper before the material is introduced into a plastic processing machine, the system including:

a drying hopper for containing hygroscopic thermoplastic material before the thermoplastic material is introduced into a plastics processing machine;

process air for drying said hygroscopic thermoplastic material contained in said drying hopper;

first and second desiccant towers, each of said towers alternating between a process cycle and a regeneration cycle while the other tower is in an opposite cycle;

desiccant contained in said first and second desiccant towers for adsorbing moisture from the process air;

regeneration air for driving moisture off saturated desiccant in one of said towers in a regeneration cycle;

air conduit means providing a path for circulating the process air between the drying hopper and the first and second desiccant towers;

air circulating means for circulating the process air through the air conduit means;

air flow directing means for directing the process air to the top end of one of said desiccant towers thereby placing said one of the towers in a process cycle while the other of the towers is placed in a regeneration cycle, said air flow directing means also directing the regeneration air exiting from a top end of said other of the towers in a regeneration cycle to a vent;

means for regulating the time period and temperature of the process and regeneration cycles;

first and second bottom heater means respectively housed adjacent to a bottom end of the first and second desiccant heating towers and extending in a plane traverse to the longitudinal direction of the respective desiccant heating towers to heat the desiccant so as to adsorb moisture from said process air circulating downwardly through one of said towers in a process cycle, and for simultaneously super-heating and driving moisture off the desiccant by means of said regeneration air circulating upwardly through the other of said towers in a regeneration cycle, said regeneration air carrying by means of convection a generally bottom-originating hot convection wave front propagating upwardly through the desiccant in said tower in a regeneration cycle; and first and second generally central heater means respectively housed between top and bottom ends of said first and second desiccant towers and extending in a plane transverse to the longitudinal direction of the respective desiccant heating towers for super-heating and driving moisture off the desiccant by means of said regeneration air carrying a generally centrally-originating hot convection wave front propagating upwardly through the desiccant of one of said towers in a regeneration cycle, the generally centrally-originating hot convection wave front coupled with the bottom-originating hot convection wave front considerably reducing the time to completely regenerate the saturated desiccant in said one of said towers in a regeneration cycle.

2. A system of drying and heating process air according to claim 1, wherein said first generally central heater means is closer to the top end than that of the bottom end of said first desiccant tower, and said second generally central heater means is closer to the top end than that of the bottom end of said second desiccant tower.

3. A system of drying and heating process air according to claim 2, wherein the distance between said first generally central heater means and the top end of said first desiccant tower is approximately between sixty percent and seventy percent of the distance between said first generally central heater means and the bottom end of said first desiccant tower; and wherein the distance between said second generally central heater means and the top end of said second desiccant tower is approximately between sixty percent and seventy percent of the distance between said second generally central heater means and the bottom end of said second desiccant tower.

4. A system of drying and heating process air according to claim 1, wherein a small portion of the process air exiting one of the desiccant towers in a process cycle becomes regeneration air to circulate upwardly through the other desiccant tower in a regeneration cycle.

5. A system of drying and heating process air according to claim 1, wherein the adsorbent is a molecular sieve.

6. A system of drying and heating process air according to claim 1, wherein the first and second bottom heater means and the first and second generally central heater means are heater coils.

7. A system of drying and heating process air according to claim 1, wherein the means for regulating the period and temperature of the process and regeneration cycles is a microprocessor controller.

8. A system of drying and heating process air according to claim 1, wherein the air conduit means takes the form of hollow cylindrical tubes.

9. A system of drying and heating process air to be circulated for drying hygroscopic thermoplastic material contained in a drying hopper before the material is introduced into a plastic processing machine, the system including:

a drying hopper for containing hygroscopic thermoplastic material before the thermoplastic material is introduced into a plastics processing machine;

process air for drying said hygroscopic thermoplastic material contained in said drying hopper;

first and second desiccant towers, each of said towers alternating between a process cycle and a regeneration cycle while the other tower is in an opposite cycle;

desiccant contained in said first and second desiccant towers for adsorbing moisture from the process air;

regeneration air taken from a small portion of the process air that is newly dried, the regeneration air driving moisture off saturated desiccant in one of said towers in a regeneration cycle;

air tubes providing a path for circulating the process air between the drying hopper and the first and second desiccant towers in a virtual closed-loop path;

blower for circulating the process air through the air tubes;

valve means directing the process air to the top end of one of said desiccant towers thereby placing said one of the towers in a process cycle while the other of the towers is placed in a regeneration cycle, said valve means also directing the regeneration air exiting from a top end of said other of the towers in a regeneration cycle to a vent;

control means for automatically regulating the time period and temperature of the process and regeneration cycles;

first and second bottom heater coils respectively housed adjacent to a bottom end of the first anti second desiccant heating towers and extending in a plane transverse to the longitudinal direction of the respective desiccant heating towers to heat the desiccant so as to adsorb moisture from said process air circulating downwardly through one of said towers in a process cycle, and for simultaneously super-heating and driving moisture off the desiccant by means of said regeneration air circulating upwardly through the other of said towers in a regeneration cycle, said regeneration air carrying by means of convection a generally bottom-originating hot convection wave from propagating upwardly through the desiccant in said tower in a regeneration cycle; and first and second generally central heater coils respectively housed generally centrally of top and bottom ends of said first and second desiccant towers and extending in a plane transverse to the longitudinal direction of the respective desiccant heating towers for super-heating and driving moisture off the desiccant by means of said regeneration air carrying a generally centrally-originating hot convection wave front propagating upwardly through the adsorbent of one of said towers in a regeneration cycle, the generally centrally-originating hot convection wave front coupled with the bottom-originating hot convection wave front considerably reducing the time to completely regenerate the saturated desiccant in said one of said towers in a regeneration cycle.

10. A system of drying and heating process air according to claim 9, wherein said first generally central heater coil is closer to the top end than that of the bottom end of said first desiccant tower, and said second generally central heater coil is closer to the top end than that of the bottom end of said second desiccant tower.

11. A system of drying and heating process air according to claim 10, wherein the distance between said first generally central heater coil and the top end of said first desiccant tower is approximately between sixty percent to seventy percent of the distance between said first generally central heater coil and the bottom end of said first desiccant tower; and wherein the distance between said second generally central heater coil and the top end of said second desiccant tower is approximately between sixty percent to seventy percent of the distance between said second generally central heater coil and the bottom end of said second desiccant tower.

12. A system of drying and heating process air according to claim 9, wherein a small portion of the process air exiting one of the desiccant towers in a process cycle becomes regeneration air to circulate upwardly through the other desiccant tower in a regeneration cycle.

13. A system of drying and heating process air according to claim 9, wherein the adsorbent is a molecular sieve.

14. A system of drying and heating process air according to claim 9, wherein the means for regulating the period and temperature of the process and regeneration cycles is a microprocessor controller.

15. A system of drying and heating process air according to claim 9, wherein the air conduit means takes the form of hollow cylindrical tubes.

16. A method of drying and heating process air to be circulated for drying hygroscopic thermoplastic material contained in a drying hopper before the material is introduced into a plastic processing machine comprising the steps of:

upwardly circulating hot, dry process air so as to dry thermoplastic material contained in a drying hopper;

providing two desiccant towers each containing desiccant for adsorbing moisture from the process air;

directing moist process air leaving the drying hopper to one of the towers thereby placing said one of the towers in a process cycle while the other of the towers is simultaneously placed in a regeneration cycle;

downwardly circulating the moist process air through said one of the desiccant towers in a process cycle to adsorb moisture from the moist process air and to heat the moist process air to a predetermined process temperature;

returning the dried process air back to the drying hopper to further dry the thermoplastic material contained therein;

simultaneously circulating hot, regeneration air upwardly through said other of the desiccant towers in a regeneration cycle whereby moisture is driven off saturated desiccant by means of upwardly propagating hot convection wave fronts originating within said other of the desiccant towers from the bottom and from a generally central portion thereof;

redirecting the moist process air leaving the drying hopper to said other of the desiccant towers after completion of the regeneration cycle thereby placing said one of the desiccant towers in a regeneration cycle and said other of the desiccant towers in a process cycle; and continuing to alternate the process and regeneration cycles between said one and said other of the desiccant towers so as to form a repeating sequence.

17. A method of drying and heating process air according to claim 16 wherein a small portion of the process air exiting one of said desiccant towers in a process cycle is directed to become the regeneration air to circulate upwardly through the other of said desiccant towers in a regeneration cycle.

18. A method of drying and heating process air according to claim 16 wherein said upwardly propagating hot convection wave front of said generally central portion of one of said desiccant towers in a regeneration cycle originates from a location which is closer to a top end of said desiccant tower than is a bottom end of said desiccant tower.

19. A method of drying and heating process air according to claim 18 wherein said upwardly propagating hot convection wave front of said generally central portion of one of said desiccant towers in a regeneration cycle originates from a location whose distance to a top end of said desiccant tower is approximately seventy percent of the distance between said generally central portion and a bottom end of said desiccant tower.

* * * * *